Sept. 30, 1969  H. D'AULERIO  3,469,808
AIRCRAFT ARRESTING GEAR BOOSTER UNIT
Filed Oct. 30, 1967

INVENTOR
HERMAN D'AULERIO
BY Thomas O. Watson Jr.
ATTORNEY

United States Patent Office 3,469,808
Patented Sept. 30, 1969

3,469,808
AIRCRAFT ARRESTING GEAR BOOSTER UNIT
Herman D'Aulerio, Bowie, Md., assignor to the United States of America as represented by the Secretary of the Navy
Filed Oct. 30, 1967, Ser. No. 678,778
Int. Cl. B64c 25/68; B64f 1/02
U.S. Cl. 244—110                 8 Claims

ABSTRACT OF THE DISCLOSURE

A fluid system containing a continuously running compressor and a double-acting cylinder having a rack formed on the outer end of the piston rod. The rack is connected through appropriate gearing to a bull gear fixed to the shaft of the energy absorber assembly of the arresting gear. A strain gage mounted on the arresting gear tape senses engagement of the aircraft hook with the pendant of the arresting gear and, through an appropriate control circuit, actuates valves in the fluid system which enable the compressor to cycle the cylinder. Corresponding movement of the rack imparts a rotative movement to the energy absorber assembly and assists in overcoming its inertia.

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

The present invention relates to improvements in aircraft arresting gear and more particularly to booster units which overcome inertia of the arresting gear.

In the field of aircraft arresting gear, one of the most formidable problems in designing successful gear has been that of dealing with the inertia of the energy absorbing assembly since such assemblies are inherently massive. Various expedients have been proposed in the past to cope with this problem, e.g., (1) bypass arrangements in hydraulic systems which serve to reduce the initial retarding force, (2) systems in which the braking or retarding force is varied in response to acceleration changes in the movement of the pendant cables, and (3) preprogrammed pressure responsive devices which eliminate all braking whenever pendant tension exceeds preselected values. These various devices have been both complex and expensive. Additionally, they have all had the serious drawback of substantially increasing the roll distance which must be allotted the aircraft due to reductions in the retarding force. This disadvantage is particularly critical when aircraft carrier landings are contemplated.

SUMMARY OF THE INVENTION

The present invention enables the construction of aircraft arresting gear systems which will enable successful arrestments at higher landing speeds than have heretofore been possible without the attendant disadvantage of lengthening the roll distance. Thus aircraft having higher than usual landing speeds due to inoperative flaps or damage to portions of the lifting surfaces may be successfully arrested without damage to either aircraft or arresting gear. Also, the present invention enables accommodation of aircraft with permissible hook loads restricted to relatively low values by airframe structural limitations. To attain these ends, the present invention provides a unique booster unit for imparting an initial rotary movement to the energy absorber assembly of an arresting gear to overcome the inertia thereof.

OBJECTS OF THE INVENTION

An object of the present invention is to provide a booster unit for aircraft arresting gear which will effectively reduce the inertia of the energy absorber therein.

Another object of the invention is to provide a booster unit for existing aircraft arresting gear which will enable higher landing speeds than was heretofore possible.

A further object of this invention is to provide a booster unit which will enable existing aircraft arresting gear to accommodate aircraft having low hook load capabilities.

Yet another object of this invention is to provide a booster unit for imparting an initial rotary movement to the energy absorber assembly of an aircraft arresting gear to reduce the inertia thereof.

BRIEF DESCRIPTION OF THE DRAWINGS

Other objects, advantages and novel features of the invention will become readily apparent upon consideration of the following detailed description when read in conjunction with the accompanying drawings in which like reference numerals designate like parts throughout the several views and wherein.

DESCRIPTION OF THE PREFERRED EMBODIMENT

Figure 1:
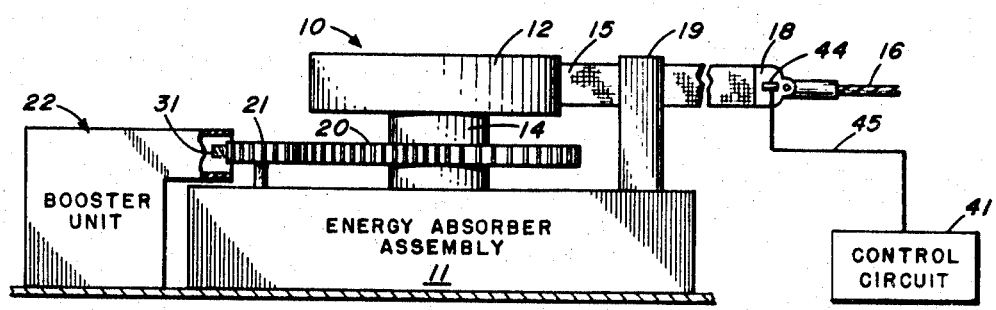
FIG. 1 is an elevation view illustrating the booster unit of the present invention coupled to an aircraft arresting gear assembly.
Figure 4:
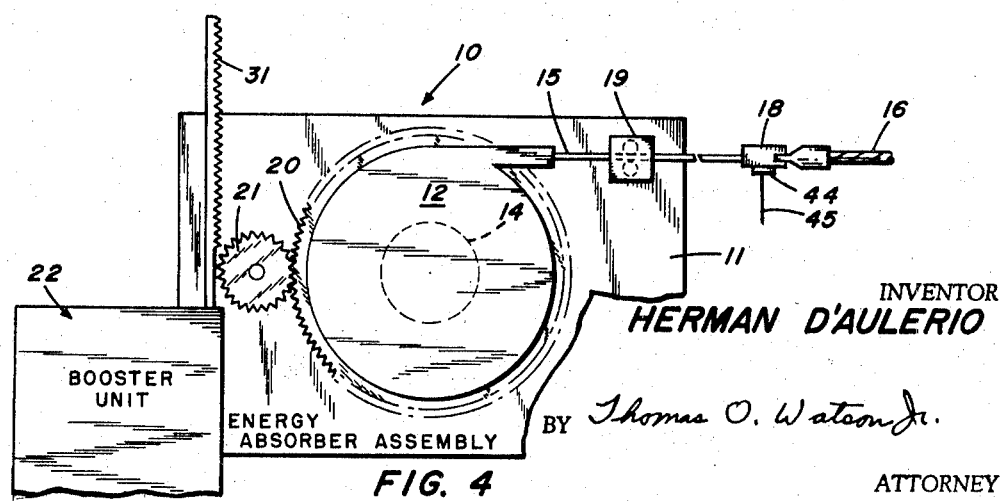
FIG. 4 is a fragmentary plan view of the apparatus of FIG. 1.

Attention now is directed to the drawings, and more particularly to FIGS. 1 and 4, wherein there is disclosed an aircraft arresting gear, designated generally by the reference numeral 10. The arresting gear 10 comprises an energy absorber assembly 11 and a tape reel 12 interconnected by a shaft 14. The energy absorber 11 may be of any configuration suitable for the intended purpose. For example, one type currently in use provides a paddle wheel or turbine submerged in water. The energy to be dissipated or absorbed is transferred to the water in the form of heat as the paddle wheel or turbine is rotated.

A tape 15, of nylon or other strong, flexible material, is wound on the reel 12 and has the free end thereof connected to a pendant cable 16 by means of a connector 18. It is to be understood, of course, that a complete aircraft arresting gear would comprise two structures such as is shown in FIGS. 1 and 4 disposed on either side of the runway or flight deck and interconnected by the pendant 16 which engages the arresting hook of the landing aircraft. A guide 19 mounted on the energy absorber 11 is provided to control the direction of tape runout. A bull gear 20 is fixed to the shaft 14 and is adapted to be driven by a rewind engine (not shown) for the purpose of rewinding the tape 15 after an aircraft has been arrested. A transfer gear 21 is fixed to the energy absorber 11 in mesh with the bull gear 20 and is adapted to be engaged by the booster unit of the present invention, designated generally by the reference numeral 22, for imparting rotary movement to the bull gear and hence to the energy absorber.

Figure 2:
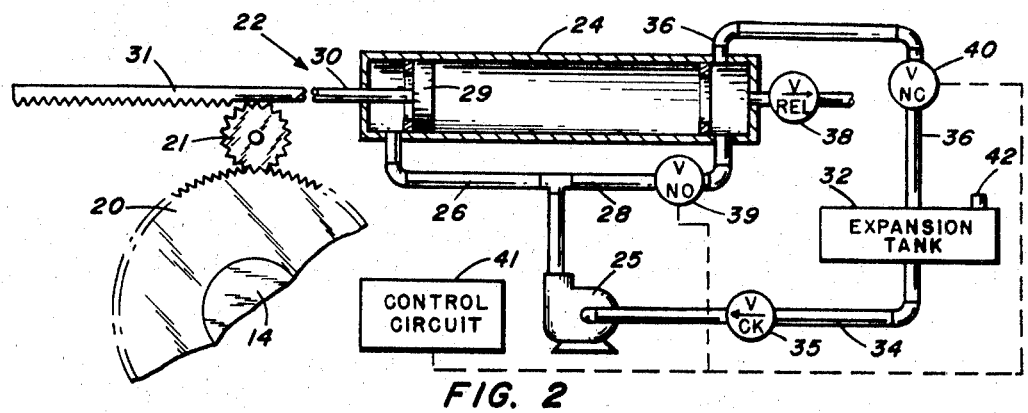
FIG. 2 is a schematic view illustrating the arrangement of the components of the booster unit and showing the piston and rack in their initial positions.
Figure 3:
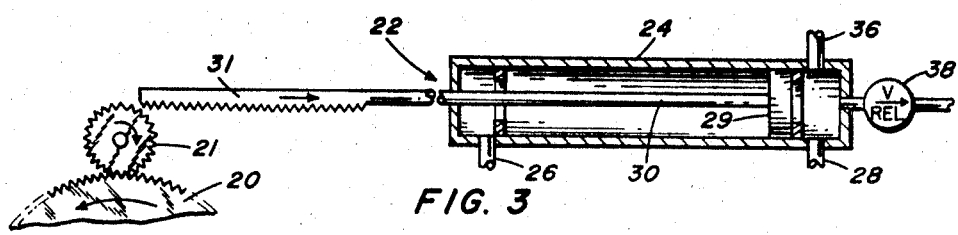
FIG. 3 is a partial schematic of the apparatus of FIG. 2 and shows the piston and rack in their positions after actuation.

Referring now to FIGS. 2 and 3, it can be seen that the booster unit comprises a double-acting, pneumatic cylinder 24 connected to a compressor 25 by means of lines 26 and 28. The cylinder 24 contains a piston 29 which mounts a piston rod 30. The piston rod 30 projects through one end of the cylinder and has a rack 31 formed on the outer end thereof which is positioned to mesh with the transfer gear 21 during cycling of the cylinder. The compressor 25 is connected to an expansion tank 32 by means of a line 34 within which is disposed a check valve 35. The expansion tank 32 is connected to one end of the cylinder 24 by means of a line 36. This same end of the cylinder 24 is provided with a relief valve 38 which serves to protect the system from excessive pressures. A normally open solenoid valve 39 is disposed in the line 28 and a normally closed solenoid valve 40 is disposed in the line 36. The valves 39 and 40 are adapted to be operated by a control circuit 41 which may be any of various conventional types suitable for the purpose. The fluid system defined by the compressor, cylinder, expansion tank and associated lines is charged with a suitable dry gas, such as nitrogen, which is admitted to the fluid system through a valve 42 on the expansion tank.

OPERATION

In order that a better understanding of the invention may be had, its mode of operation will now be described. Whenever an arrestment is to be made, the compressor 25 is started and permitted to run continuously. Since the valves 39 and 40 are open and closed, respectively, at the beginning of a cycle of operation, the compressor outlet pressure will be applied to both sides of the piston 29 within the cylinder 24; it being understood that the relief valve 38 is set to release at some pressure higher than the normal operating pressure of the system. With the effective area of the left hand side of the piston 29 (as viewed in FIG. 2) reduced by the amount of the cross-sectional area of the piston rod 30, the fluid pressure within the cylinder will exert a greater force on the right hand side of the piston and thus maintain the piston in the position shown n FIG. 2.

When the arresting hook of a landing aircraft engages and pulls along with it the pendant 16, the tape 15, pendant 16 and connector 18 will all be placed in tension. The tension will be sensed by a strain gage 44 fixed to the connector 18 and electrically connected to the control circuit 41 by means of cable 45. The cable 45 may be of considerable length in order that it may run out with the tape 15 or it may be provided with a connector (not shown) which will separate after the strain gage signal has been received by the control circuit. The signal from the strain gage 44 actuates the control circuit which in turn energizes the solenoid valves 39 and 40. Energization of the solenoid valves closes the normally open valve 39 and opens the normally closed valve 40. This results in compressor outlet pressure being applied only to the left hand end of cylinder 24 while the right hand end thereof is vented to the expansion tank 32.

The unbalanced fluid pressure on the left hand side of the piston 29 begins moving the piston to the right (as viewed in FIG. 2) moving the rack 31 into mesh with the transfer gear 21. Continued movement of the piston and rack to the right imparts rotary movement to the transfer and bull gears as indicated by the arrows in FIG. 3. The piston 29 continues to move to the right until it reaches the position shown in FIG. 3 at which time the rack 31 clears the transfer gear 21 in order that further runout of the tape 15 under the influence of the pull exerted by the aircraft may continue unimpeded. After the aircraft has stopped and the pendant 16 has been cleared from the aircraft arresting hook, the control circuit 41 is deactivated to return the valves 39 and 40 to their normal positions. This creates an unbalanced force on the right hand side of the piston 29 which will return the piston to the position shown in FIG. 2 at which time the rack 31 again clears the transfer gear 21 in order that the tape 15 may be rewound on the reel 12 by the rewind engine (not shown). The booster unit 22 is then conditioned for the next arrestment.

CONCLUSION

In conclusion, it is believed that it has been made clear that the aforedescribed invention possesses numerous advantages which are not present in the prior art devices. The rotary movement imparted to the bull gear 20 by movement of the rack 31 obviously reduces the inertia of the energy absorber 11 as sensed by the tape 15. This momentary reduction in the inertia of the energy absorber enables existing aircraft arresting gear assemblies to successfully arrest aircraft which heretofore could not be arrested without damage to either arresting gear or air frame structure. Such aircraft would be those whose high landing speeds, due to advanced aircraft design or damage to the flaps and lifting surfaces, would result in tensile forces in the tape and pendant in excess of design maximums and those aircraft whose design were such that excessive stresses would be set up in the arresting hook and/or airframe in the absence of an inertia reduction.

Obviously many modifications and variations of the present invention are possible in the light of the above teachings.

What is claimed is:

1. In an aircraft arresting gear of the class wherein an energy absorbing assembly including a rewind bull gear applies a retarding force to a reel mounting a pendant assembly, as the pendant assembly is pulled from the reel by the arresting hook of a landing aircraft, the combination with said energy absorbing assembly of:
   means on said pendant assembly for sensing engagement of the arresting hook of said landing aircraft with said pendant assembly;
   means on said energy absorbing assembly for imparting an initial rotary movement to said reel in the direction of pendant assembly runout; and
   control means connected to said sensing means and responsive to a signal from said sensing means for actuating said rotary movement imparting means whereby the inertia of the energy absorbing assembly and hence the retarding force are momentarily reduced.

2. The combination defined in claim 1 wherein said rotary movement imparting means comprises:
   a fluid pressure system;
   means in said fluid pressure system and responsive to said control means for cyclically operating said fluid pressure system; and
   means responsive to cycling of said fluid pressure system for engaging and rotating said bull gear.

3. The combination defined in claim 1 wherein said sensing means comprises:
   a strain gage fixed to said pendant assembly; and
   a cable connecting said strain gage to said control means.

4. The combination defined in claim 1 wherein said rotary movement imparting means comprises:
   a double-acting, pneumatic cylinder having a piston therein and a piston rod projecting from one end thereof;
   means coupled to said cylinder for supplying pressurized fluid to both ends of said cylinder whereby said piston rod is normally maintained in the fully extended position due to the area differential of the faces of said piston;
   means connected to said cylinder and responsive to operation of said control means for blocking the supply of pressurized fluid to the other end of said cylinder and for venting the other end of said cylinder whereby the pressurized fluid will move said piston to the other end of said cylinder and retract said piston rod; and
   means interconnecting the free end of said piston rod and said bull gear for rotating said bull gear as said piston rod moves.

5. The combination defined in claim 4 wherein said pressurized fluid supplying means comprises a compressor.

6. The combination defined in claim 4 wherein said blocking means comprises a pair of solenoid valves.

7. The combination defined in claim 4 wherein said interconnecting means comprises:
- a rack formed integral with the free end of said piston rod; and
- a transfer gear mounted on said energy absorbing assembly in mesh with said bull gear and adapted to mesh with said rack when said piston rod moves.

8. In an aircraft arresting gear of the class wherein an energy absorbing assembly including a rewind bull gear applies a retarding force to a reel mounting a pendant assembly, as the pendant assembly is pulled from the reel by the arresting hook of a landing aircraft, the combination with said energy absorbing assembly of:
- a double-acting, pneumatic cylinder mounted on said energy absorbing assembly, said cylinder having a piston disposed therein and a piston rod secured to said piston and projecting from a first end of said cylinder;
- a compressor having the outlet thereof connected to both ends of said cylinder for supplying pressurized fluid to said cylinder whereby said piston rod is normally maintained in the fully extended position due to the area differential of the faces of the piston;
- a line including an expansion tank connecting the second end of said cylinder to the inlet of said compressor;
- a normally open solenoid valve interposed between said compressor outlet and the second end of said cylinder;
- a normally closed solenoid valve disposed in said line between said expansion tank and the second end of said cylinder;
- a rack formed integral with the free end of said piston rod;
- a transfer gear mounted on said energy absorbing assembly in mesh with said bull gear and adapted to mesh with said rack when said piston rod moves;
- a strain gage fixed to said pendant assembly; and
- control means connected to said strain gage and responsive to a signal from said strain gage for closing said normally open solenoid valve and opening said normally closed valve allowing the pressurized fluid to move said piston to the second end of said cylinder imparting rotary movement to said bull gear through the operation of said rack and transfer gear whereby the inertia of the energy absorbing assembly and hence the retarding force sensed by the pendant assembly are momentarily reduced.

References Cited

UNITED STATES PATENTS

| | | | |
|---|---|---|---|
| 2,987,278 | 6/1961 | Hoffman et al. | 244—110 |
| 3,350,039 | 10/1967 | Crater | 244—110 |

MILTON BUCHLER, Primary Examiner

PAUL E. SAUBERER, Assistant Examiner